US008625441B2

(12) United States Patent
Hittel et al.

(10) Patent No.: US 8,625,441 B2
(45) Date of Patent: Jan. 7, 2014

(54) SYSTEM AND METHOD FOR MEASURING AND DISPLAYING PRESENCE OF WIRELESS LOCAL AREA NETWORK DEVICES (75) Inventors: John Paul Hittel, Scottsdale, AZ (US); Peter Oakley, Langley, WA (US); Olivier Calle, Marysville, WA (US)

(73) Assignee: Fluke Corporation, Everett, WA (US)

( * ) Notice: Subject to any disclaimer, the term of this patent is extended or adjusted under 35 U.S.C. 154(b) by 409 days.

(21) Appl. No.: 12/850,523

(22) Filed: Aug. 4, 2010

(65) Prior Publication Data
US 2011/0103242 A1    May 5, 2011

Related U.S. Application Data (60) Provisional application No. 61/256,291, filed on Oct. 29, 2009.

(51) Int. Cl.
*H04L 12/26* (2006.01)
(52) U.S. Cl.
USPC .............................. 370/252; 370/328; 370/338
(58) Field of Classification Search
None
See application file for complete search history.

(56) References Cited

U.S. PATENT DOCUMENTS

| | | | | |
|---|---|---|---|---|
| 6,473,794 | B1 * | 10/2002 | Guheen et al. | 709/223 |
| 6,674,738 | B1 * | 1/2004 | Yildiz et al. | 370/338 |
| 6,975,963 | B2 * | 12/2005 | Hamilton et al. | 702/182 |
| 7,016,948 | B1 * | 3/2006 | Yildiz | 709/221 |
| 7,251,685 | B1 * | 7/2007 | Yildiz | 709/221 |
| 7,515,916 | B1 * | 4/2009 | Alexander | 455/456.1 |
| 8,019,352 | B2 * | 9/2011 | Rappaport et al. | 455/456.1 |
| 2004/0028123 | A1 | 2/2004 | Sugar et al. | |
| 2004/0064293 | A1 * | 4/2004 | Hamilton et al. | 702/182 |
| 2005/0076113 | A1 * | 4/2005 | Klotz et al. | 709/224 |
| 2005/0128988 | A1 * | 6/2005 | Simpson et al. | 370/338 |
| 2005/0245269 | A1 * | 11/2005 | Demirhan et al. | 455/452.1 |
| 2006/0014536 | A1 | 1/2006 | Demirhan et al. | |
| 2006/0217116 | A1 * | 9/2006 | Cassett et al. | 455/423 |
| 2006/0221927 | A1 * | 10/2006 | Yamada et al. | 370/345 |
| 2007/0214412 | A1 * | 9/2007 | Arquie et al. | 715/526 |
| 2009/0129324 | A1 * | 5/2009 | Soneda | 370/329 |

OTHER PUBLICATIONS

European Patent Application No. 10189331.1, Extended European Search Report, 13 pages, Jun. 30, 2011.
Atheros Communications, Inc., "Atheros Company Overview," 2 pages, Mar. 25, 2009.
Atheros Communications, "AR9002WB-1NGB Industry's First 1-Stream 11n PCIe and Bluetooth Combo Solution," 2 pages, 2009.

* cited by examiner

*Primary Examiner* — Michael J Moore, Jr.
(74) *Attorney, Agent, or Firm* — Edwards Wildman Palmer LLP; Scott D. Wofsy; Christopher J. Capelli (57) ABSTRACT

An instrument is disclosed that is capable of detecting and graphically displaying channel usage and the number of access points operating on each channel of interest. By using a module that counts the number of elapsed clock cycles, the total cumulative duration of detected frames, and the number of channel in-use cycles, the instrument can determine the percentage of time a channel is in use, the percentage of time of IEEE 802.11 usage on a channel, and the percentage of time of non-IEEE 802.11 usage on a channel. Further, channels are scanned for access point activity using a scanning algorithm that interleaves scanning channels at a first duration longer than the beacon interval and scanning channels at a second shorter duration.

16 Claims, 8 Drawing Sheets

SYSTEM AND METHOD FOR MEASURING AND DISPLAYING PRESENCE OF WIRELESS LOCAL AREA NETWORK DEVICES

CROSS-REFERENCE TO RELATED APPLICATIONS

This application claims the benefit of the following application which is incorporated by reference in its entirety, U.S. Provisional Application No. 61/256,291, entitled "SYSTEM AND METHOD FOR MEASURING AND DISPLAYING PRESENCE OF WIRELESS LOCAL AREA NETWORK DEVICES," filed Oct. 29, 2009.

BACKGROUND

When a network technician services a local area network, such as an IEEE 802.11 network, it may be advantageous to assess various operational parameters of the network. Such parameters may include, for example, how crowded the channels in the intended operating band are in the local area, whether there is too much noise, and which channels might be assigned a new access point (AP) based upon respective levels of network traffic. These parameters may be particularly relevant, for example, when troubleshooting slow networks or otherwise evaluating where to install an additional access point for the local area network. Typically, additional devices should not be added to a channel that is already overused or has too many APs on it.

For an IEEE 802.11 network, the two main operating bands over which the IEEE 802.11 set of standards presently are controlling are at 2.4 GHz and 5 GHz. These operating bands may become crowded with devices that operate using the IEEE 802.11 protocol, as well as with devices that operate using non-IEEE 802.11 protocol or other devices that contribute noise within these bands. Accordingly, network technicians that service IEEE 802.11 networks may utilize testing equipment including network diagnostic instruments to assess various conditions associated with the network.

The following description is generally directed to systems and methods that may be utilized in connection with analyzing network devices and networks, including, for example, local area networks such as one operating in accordance with the IEEE 802.11 network protocol.

BRIEF DESCRIPTION OF THE DRAWINGS

Examples of an instrument and method for measuring and displaying the presence of wireless local area network (WLAN) devices operating on particular wireless channels are illustrated in the figures. The examples and figures are illustrative rather than limiting.

DETAILED DESCRIPTION

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

A wireless network diagnostics instrument is described below that provides an easily-interpreted, graphical view of the usage of wireless channels in a local environment. The channels that can be monitored include, but are not limited to, the 2.4 GHz and the 5 GHz spectral bands. For each of the wireless channels of a particular band or bands, the instrument can provide an indication of the presence of signals that follow IEEE 802.11 protocol, non-IEEE 802.11 protocol signals (e.g., Bluetooth devices, microwave ovens, cordless telephones, video phones, wireless cameras, and noise that are present within the band(s)), and the number of access points (APs) that are operating on each channel. This information can be used diagnostically for many purposes, such as for determining whether a particular channel's bandwidth is overused, especially when communication to a specific client is slow. It can also be utilized for selecting a channel or channels for installing new APs. The indication of the presence of signals that do not follow IEEE 802.11 protocol permits the identification of sources of interference to IEEE 802.11 protocol signals. Further, the presentation of information can indicate which channels are legally available for use in a particular region and/or country for determining whether detected access points are operating on permitted frequencies.

Figure 1A:
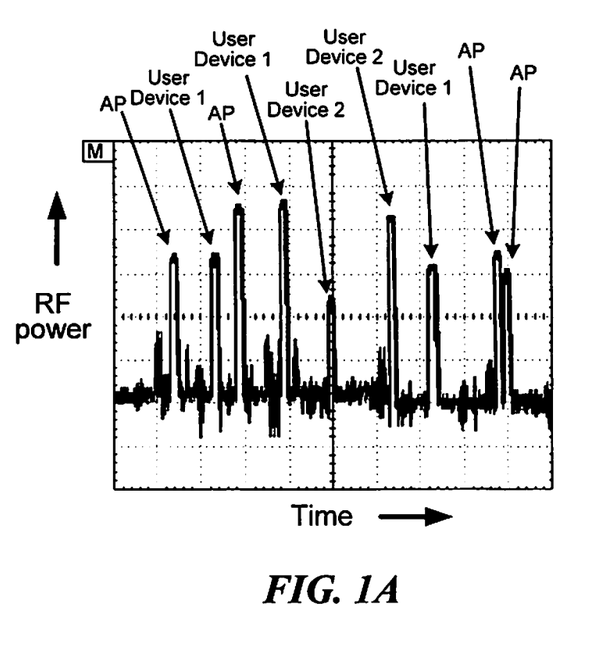
FIGS. 1A and 1B depict wireless network channel utilization information displayed from an oscilloscope.
Figure 1B:
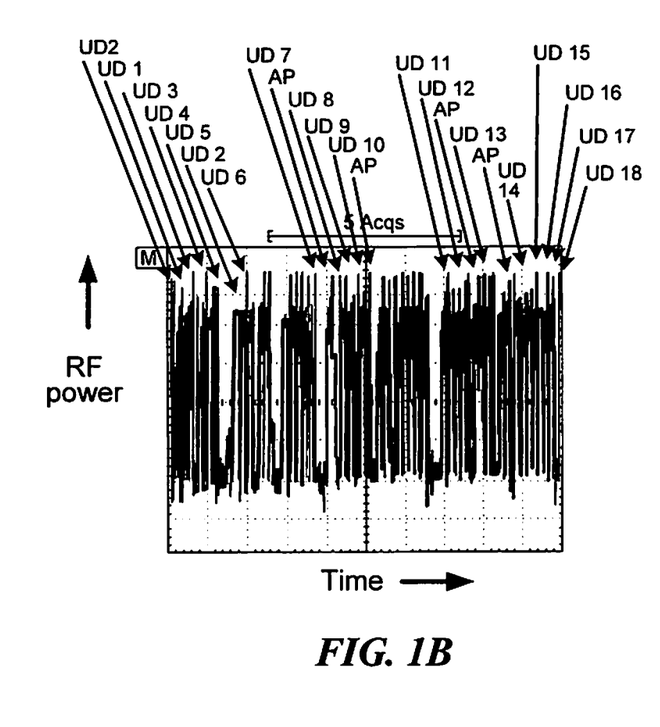

Channel utilization in a local area network, such as in the IEEE 802.11 operating bands, can be determined in a conventional manner with a tunable radio frequency (RF) detector and an oscilloscope. For example, IEEE 802.11 network data transmitted at two different frequencies are detected via an RF detector and displayed in two different oscilloscope traces, as shown in FIGS. 1A and 1B, where time is shown on the horizontal axis, and RF power is shown on the vertical axis. Each spike in the oscilloscope traces represents a packet of IEEE 802.11 data. Each channel frequency is shared by multiple users (as indicated by a user name in the figures) and/or APs, and the users and/or APs take turns transmitting over the channel. In FIG. 1A, there are only two user devices, User Device 1 and User Device 2, sharing the channel with at least one, and possibly more, APs. In FIG. 1B, for the same time period, there are 18 user devices sharing the channel with one or more APs. Thus, the oscilloscope traces show that the channel monitored in FIG. 1A is much less crowded than the channel monitored in FIG. 1B. However, RF detectors and oscilloscopes are not usually available to a network technician for performing network analysis. Moreover, while oscilloscope traces provide some information as to which channels are in use, the traces do not provide an easy way to interpret usage of the entire frequency spectrum of a local area network (such as the IEEE 802.11 frequency spectrum), nor does it provide information regarding the number of APs that are already assigned to a particular channel.

Atheros Communications of Santa Clara, Calif. is a manufacturer of chipsets (for example, the 9000 series chipset) that can scan and monitor wireless communication channels. The chipsets include a plurality of counters, including a cycle counter, a received-frames counter, and a channel-not-clear counter. Each of these counters can be set to monitor a particular channel, and the counters continue to monitor that channel until given a command to monitor a different channel. Each counter stores its information in a read/write register inside the chip, and the data is available in binary format from the registers. A processor in the wireless network diagnostics instrument accesses the registers of the chipset through the chip's bus interface. Alternatively or additionally, other counters may be supported by the chipset.

The cycle counter continuously counts every clock cycle that elapses from when the counter is initialized; the received-frames counter counts the total cumulative duration of detected IEEE frames; and the channel-not-clear counter counts the number of clock cycles over which a particular channel is in use either due to detected IEEE frames or interference. When the processor in the wireless network diagnostics instrument is ready to begin acquiring data from the counters, it commands the counters to monitor a particular channel and then writes a zero to each of the registers in quick succession. The counters each count their respective data, and after a suitable measurement period has elapsed, the processor reads the information from each of the registers, again in quick succession.

In accordance with an exemplary embodiment as described, the counter information provided by an IEEE 802.11n connectivity chipset to the processor of the wireless network diagnostics instrument can be processed and provided in a useful visual display for network technicians. In one embodiment, the counter functions provided by the chipset can be performed by other hardware and/or software modules. Upon receiving the counter information, in one embodiment, the information is broken down into channel usage time for transmissions that follow IEEE 802.11 protocol as well as transmissions that do not follow IEEE 802.11 protocol. The durations over which the various transmissions are present over a particular channel are accumulated over a fixed measurement period, and then a duty cycle of percentage of usage during the measurement period is calculated. Each channel is scanned for a period of time, and the results for each channel are processed to provide an average usage that is presented to the network technician in a graphical manner that is simple to interpret.

Figure 2A:
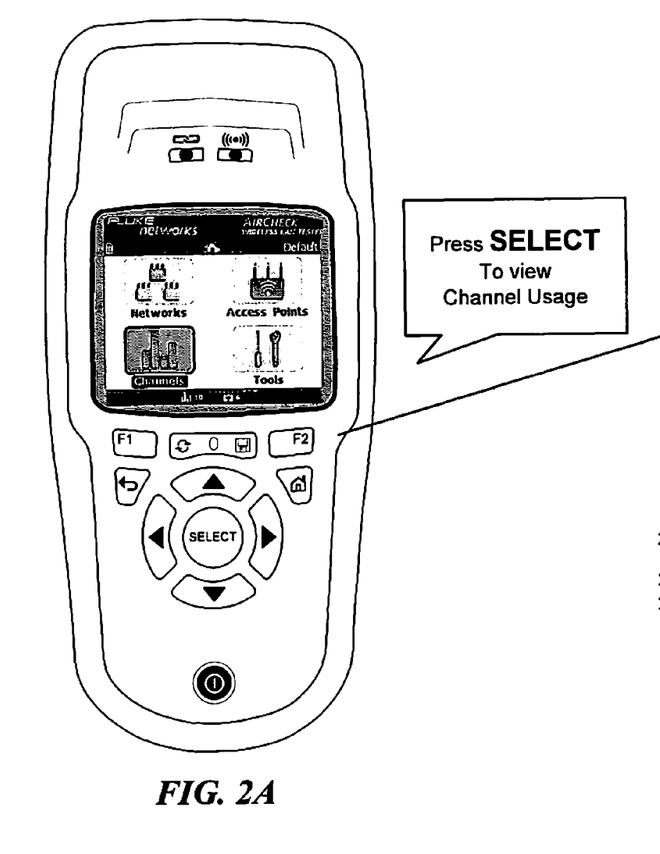
FIGS. 2A-2C illustrate an exemplary wireless network diagnostics instrument with a display screen, and exemplary close-ups of the screen further illustrating overall channel usage, according to an embodiment of the disclosure.
Figure 2B:
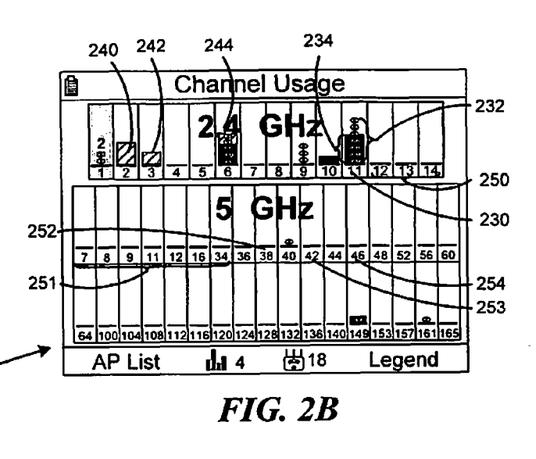

An exemplary wireless network diagnostics instrument is depicted in FIG. 2A. Selection of the "Channels" function on the instrument prompts the instrument to provide a display of overall channel usage, as shown in FIG. 2B. The display in FIG. 2B provides information about channel usage for each channel in a band, for example, the percentage of time a channel is used for transmissions that follow IEEE 802.11 protocol, the percentage of time the channel is used for transmissions that do not follow IEEE 802.11 protocol, and the number of APs operating on the channel. Certain channels may be designated by a country's regulations as illegal for use for IEEE 802.11 signal transmission in a particular region or the entire country. These Illegal channels can be identified using a different color on the display shown in FIG. 2B, for example, red, to make it easy to determine which channels are permitted for operating APs and transmitting IEEE 802.11 signals.

Figure 2C:
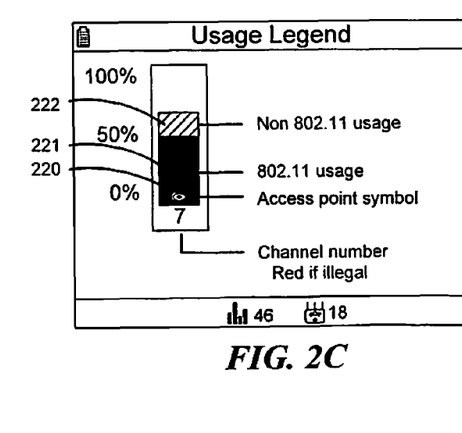

The "usage legend" in the exemplary screen depicted in FIG. 2C indicates that IEEE 802.11 usage is shown as a shaded area 221, and non-IEEE 802.11 usage is shown as a cross-hatched area 222. Easy to distinguish colors, such as blue and gray, can be used on the screen as an alternative to shaded and cross-hatched areas. Each AP detected on a channel is depicted using an AP symbol 220. A different color that is easy to distinguish, such as black, can be used for the AP symbol.

Wireless utilization information is shown in FIG. 2B in a stacked bar format. The bars are linearly scaled to represent approximate percentage of channel usage. FIG. 2B indicates that there are seven APs 232 operating on channel 11 230, and IEEE 802.11 network traffic 234 is using approximately 50% of the available capacity of the channel. The screen additionally indicates that there is some non-IEEE 802.11 interference 240, 242, 244 on channels 2, 3, and 6, respectively, that occupy available channel capacity. In the exemplary screen, illegal channel numbers 250, 251, 252, 253, 254 are shown in a different color. The example view shown in FIG. 2B can provide visual feedback to the network technician as to the state of the wireless environment in the surrounding area.

Figure 3A:
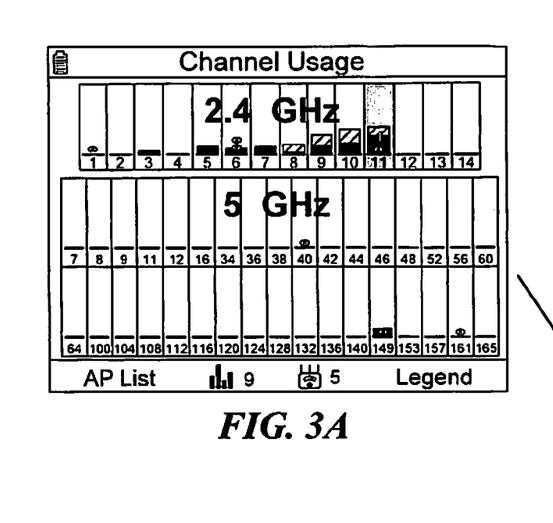
FIGS. 3A-3B illustrate a detailed view of channel usage and channel usage as a function of time for a specific channel, according to an embodiment of the disclosure.
Figure 3B:
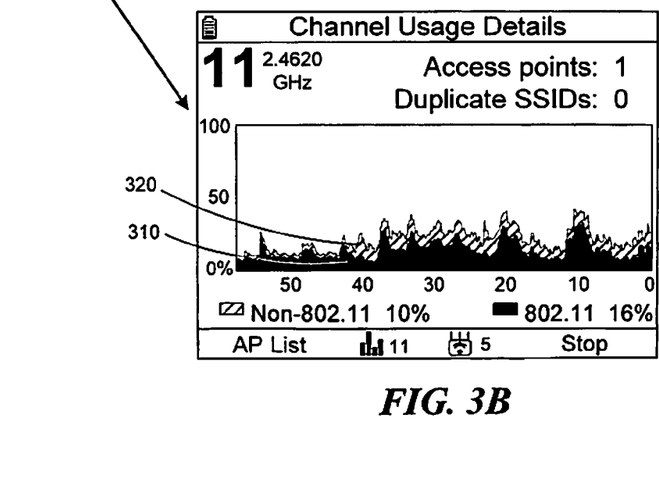
Figure 4:
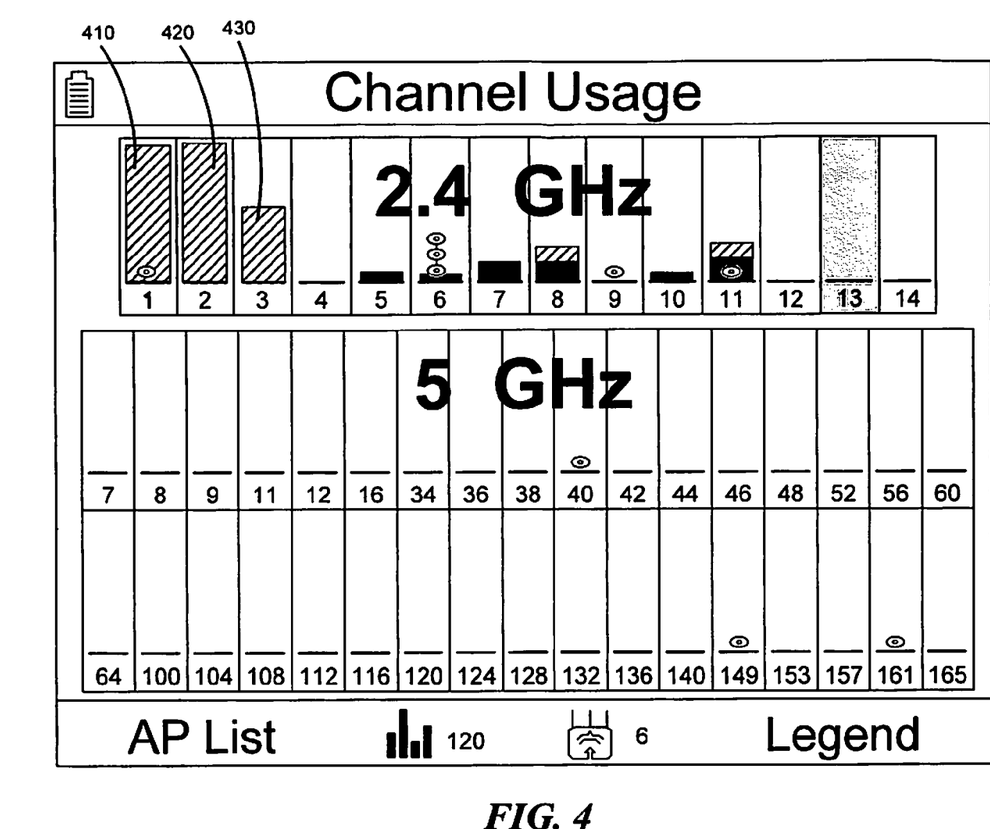
FIG. 4 illustrates a detailed view of overall channel usage for a particular scenario, according to an embodiment of the disclosure.

The examples of visual displays shown in FIGS. 2-4 show possible embodiments of presentation of channel usage information to network technicians. Other embodiments that can provide a useful display of channel usage are possible including, but not limited to, pie charts, horizontal bar charts, and stacked area charts. Similarly, other types of markers and different color or shading schemes can be used with any of these different types of displays.

FIG. 3B shows a detailed view of channel usage as a function of time for a specific channel whose channel usage is shown in FIG. 3A. The view in FIG. 3B, shows channel usage as a function of time along the horizontal axis. This view is useful, for example, to support further trouble shooting or investigation of channels. A network technician uses the key pad on the instrument to highlight a desired channel, for example channel 11 as shown in FIG. 3A and then presses "Select" to bring up the channel usage details screen shown in FIG. 3B. This screen provides a graph of channel usage as a function of time that shows both 802.11 usage 310 (in a first color or shading) and non-IEEE 802.11 usage 320 (in a different color or shading) on top of the IEEE 802.11 usage for the selected channel. In particular, this view can be helpful to detect intermittent channel availability.

Having the ability to detect and display non-IEEE 802.11 usage can be very useful for troubleshooting wireless connectivity problems. For example, consider a wireless client who normally connects to an AP on channel 1 of the 2.4 GHz band. If the client installs a common wireless camera and then experiences wireless bandwidth and connection issues, the problem would be immediately evident with a wireless network diagnostics instrument which provides the display shown in FIG. 4. Channels 1, 2, and 3 are filled with non-IEEE 802.11 signals 410, 420, 430, and virtually no bandwidth is available to the client on channel 1. This information assists the network technician in looking for the source of the problem and would likely allow the technician to quickly spot the wireless camera that had just been installed.

The presence of APs operating on a particular channel is detected by receiving a regular beacon sent out by each of the APs. An AP sends out a beacon approximately every 100 ms to provide information such as a time stamp, supported rates, capability information, and channel numbers. In the 2.4 GHz band, for example, there are up to 14 channels that can be used. Thus, if a system were to scan all 14 channels, it would have to scan each channel for at least 100 ms, the beacon interval, to guarantee that the beacon from each AP is received and detected, and it would take at least 1.4 seconds to consecutively scan all 14 of the channels. In one embodiment, each channel can be scanned for a time greater than the beacon interval, for example up to 110 ms, in order to not miss any beacons. In this scenario, if a device, such as a microwave oven, were turned on and contributed noise on one or more of the channels, it could take up to a few seconds before a network technician scanning the channels would be aware of the noise emanating from the microwave. Ideally, scanning each of the channels should be done as fast as possible to gather accurate usage information, but the dwell time at each channel should be long enough in order to receive the beacon from any AP operating on the channel.

In order to provide timely and useful channel usage information, in one embodiment, the channels are scanned using a scanning algorithm that incorporates at least two different measurement periods, a longer period, for example 100 ms, and a shorter period, for example 10 ms. In one embodiment, the shorter period can be, for example up to 20 ms, in order to minimize the time spent scanning channels in between the scans of the channels at the longer period. Then the scanning algorithm interleaves the long and short measurement periods such that all of the channels are monitored in less than 1.4 seconds.

Figure 5:
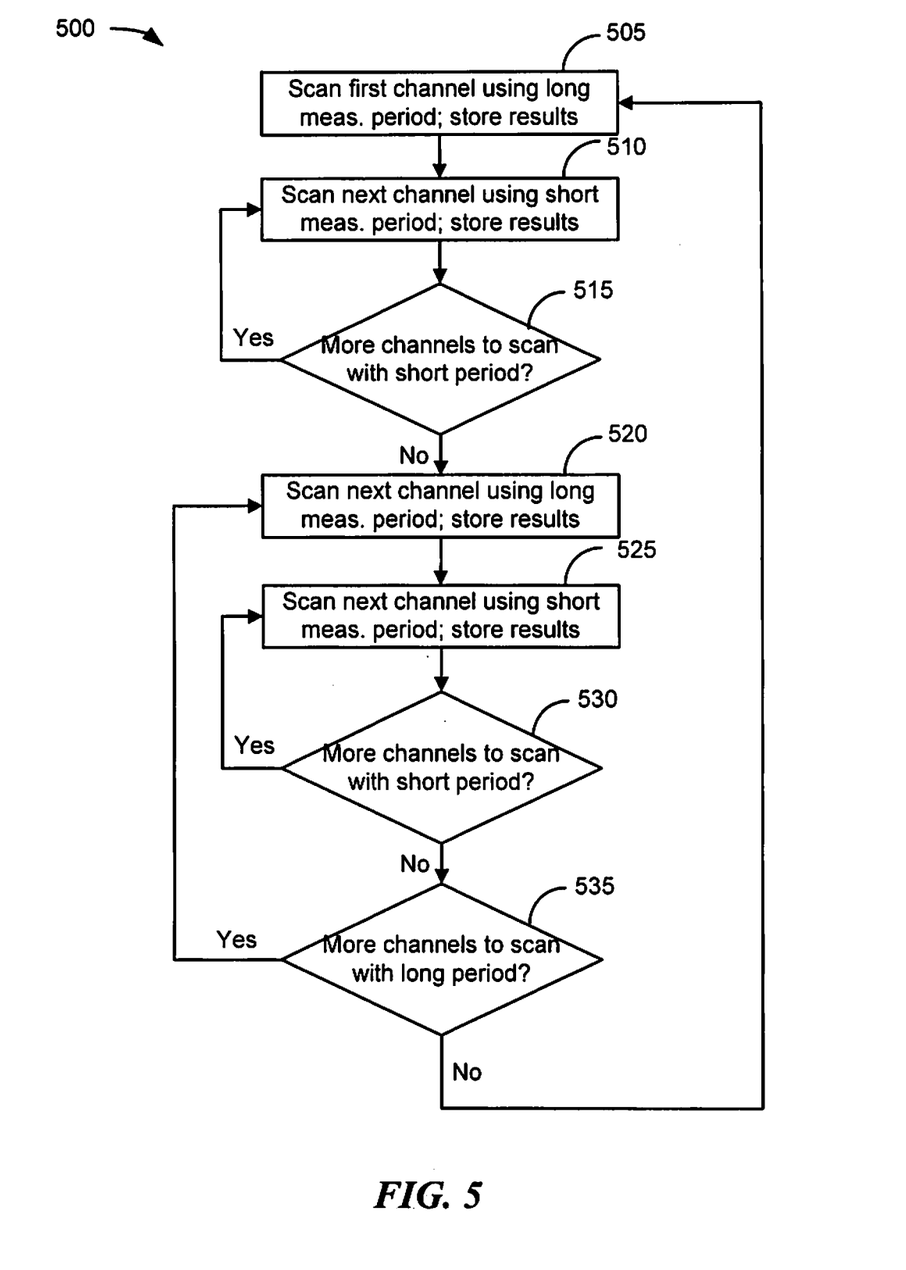
FIG. 5 depicts a flow diagram illustrating an exemplary process of scanning channels to determine channel usage, according to an embodiment of the disclosure.

FIG. 5 depicts a flow diagram illustrating an exemplary process 500 of scanning channels to determine channel usage, including detecting the presence of APs on the channels, according to an embodiment of the disclosure. For clarity of explanation, the 14 available channels in the 2.4 GHz band will be used to describe the algorithm. At block 505, a first channel is scanned at the longer measurement period, for example 100 ms, to detect usage of the channel and any AP beacons. Any activity detected on the first channel is stored. In one embodiment, the usage display is immediately updated. Alternatively or additionally, the usage display can be updated after a fixed duration has elapsed or after all 14 channels have been scanned.

Then at block 510, one of the remaining 13 channels is quickly scanned at the shorter measurement period, and information about channel activity is stored. At decision block 515 the system decides if there are any more channels to be scanned at the short measurement period. There are more channels to be scanned if not all 13 of the remaining channels have been scanned at the short measurement period. If there are more channels to scan (block 515—Yes), the process returns to block 510 where another one of the 13 channels is scanned. If there are no more channels left to scan (block 515—No), the process continues to block 520 to scan the next channel at the long measurement period. The loop between block 510 and decision block 515 scans all of the 13 channels at the short measurement period, for example 10 ms, resulting in a total time of 130 ms. Thus, all 14 of the channels are scanned, at least quickly, in a total of 230 ms between block 505 and prior to starting block 520.

At block 520, the next channel in the 2.4 GHz band is scanned at the long measurement period. Again, any activity detected on this channel is stored. In order to scan all of the channels in the least amount of time, this channel should not be the same as the first channel scanned at block 505; it should be one of the other 13 channels in the band. However, in one embodiment, all of the channels to be monitored can be scanned in any order.

At block 525, one of the channels is scanned at the short measurement period, and the information about channel activity is stored. Then at decision block 530, the system determines if there are any more channels to scan at the short measurement period. The same criterion is used as with decision block 515. If there are more channels to scan at the short measurement period (block 530—Yes), the process returns to block 525 to scan the next channel at the short measurement period. If all 13 of the other channels have been scanned at the short measurement period (block 530—No), the process continues to decision block 535 where the system determines if there are any more channels to scan at the long measurement period. If there are more channels to scan at the long measurement period (block 535—Yes), the process returns to block 520 to scan the next channel using the long measurement period. If there are no more channels to scan at the long measurement period (block 535—No), the process returns to block 505 to start the entire scan process again.

Essentially, in process 500, each of the 14 channels in the band is scanned at the long measurement period, and interleaved between the scanning of each channel at the long measurement period, the other channels in the band are scanned at the short measurement period. In one embodiment, all of the other channels in the band are scanned at the short measurement period. However, the algorithm can be adjusted to scan fewer than all of the other channels in the band.

It may take (230 ms×13 channels)+100 ms or more than three seconds to scan each of the 14 channels for 100 ms to check for all AP beacons in the operating band while interleaving with scans of the channels at the short measurement period. In one embodiment, before implementing the faster scanning algorithm just described, all of the channels are scanned for 100 ms to ensure that all APs are accounted for in as short a time as possible. Measurement periods different from 100 ms and 10 ms can be used, as long as one of the measurement periods is long enough to capture all AP beacons on any particular channel. Further, it is possible to use more than two different measurement periods in a scanning algorithm. The above-described algorithm is intended to be a non-limiting example of a scanning algorithm that is faster than an algorithm that scans each channel in the band for a fixed duration that is longer than the beacon interval.

Figure 6A:
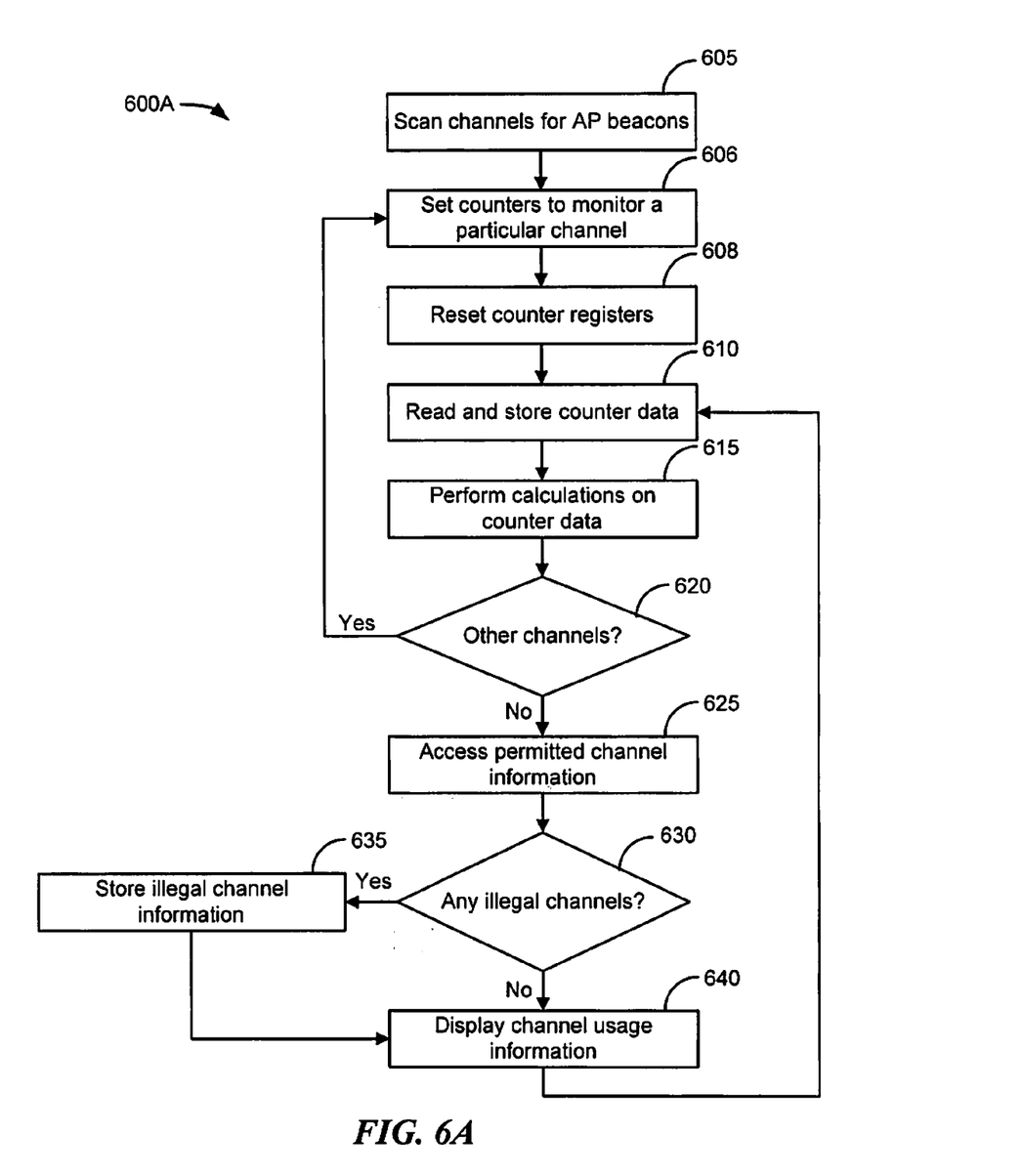
FIGS. 6A-6C depict flow diagrams illustrating an exemplary process of determining transmissions of IEEE 802.11 protocol signals, transmission of non-IEEE 802.11 protocol signals, and the number APs operating on each channel in a band of interest, according to an embodiment of the disclosure.

FIG. 6A depicts a flow diagram illustrating an exemplary process 600A of determining IEEE 802.11 usage, non-IEEE 802.11 usage, and the number APs operating on each channel in a band of interest, according to an embodiment of the disclosure.

At block 605 the system scans the wireless channels in the band of interest for operating access points. Because each access point transmits a beacon at regular beacon intervals, the system can determine the number of APs using a particular wireless channel by counting the number of unique AP beacons that are detected. This process was described in detail above with the channel scanning process 500 shown in FIG. 5.

At block 606, the system sets the counters to monitor a first channel. The counters continue to monitor this channel until commanded to monitor a different channel. Then at block 608, the system resets the counter registers to zero to begin monitoring the channel.

Figure 6B:
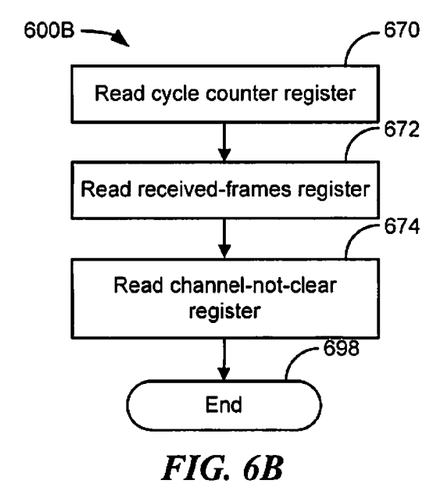

At block 610, the system reads and stores the data from the counter registers from a chipset or other counting module or modules. The chipset or counting module is adapted to receive transmissions over wireless channels in at least the 2.4 and 5 GHz bands. More details about block 610 are given by the receiving process 600B shown in FIG. 6B. At block 670, the system reads the cycle counter register to obtain the number of clock cycles that have elapsed since the counter was set to zero. At block 672, the system reads the received-frames register to obtain the total cumulative duration of detected IEEE frames since the counter was set to zero. And at block 674, the system reads the channel-not-clear counter to obtain the number of clock cycles over which the particular wireless channel was in use since the counter was set to zero. The process of reading counting information ends at block 698. Other information not described herein relating to the wireless channels in the band of interest can also be provided by the chipset or counting module(s) to the system. The period over which the chipset or other module(s) accumulates the counting information can occur simultaneously during the scanning for AP beacons. Alternatively, this counting period can occur separately.

Figure 6C:
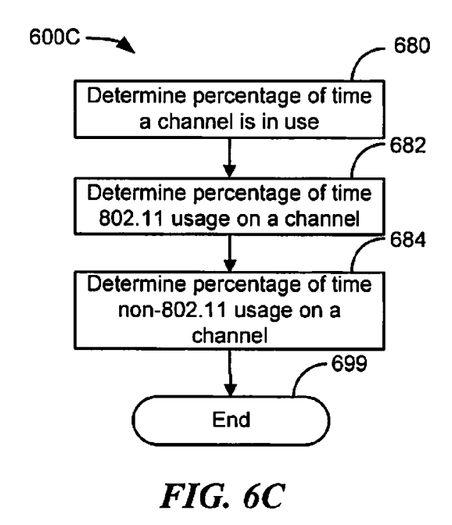

Returning to block 615 of process 600A, the system processes the received counting information. More details about block 615 are given by the calculating process 600C shown in FIG. 6C. At block 680, the system determines the percentage of time that a wireless channel is in use by dividing the number of in-use clock cycles received at block 674 by the total number of elapsed clock cycles received at block 670. At block 682, the system determines the percentage of time that a wireless channel is used for IEEE 802.11 transmissions by dividing the cumulative duration of detected IEEE frames obtained at block 672 by the total number of clock cycles received at block 670 times the duration of the clock cycle. Then at block 684, the system subtracts the percentage of time that the wireless channel is used for IEEE 802.11 transmissions (calculated at block 682) from the percentage of time that the same wireless channel is in use (calculated at block 680) to determine the percentage of time that the wireless channel is used by non-IEEE 802.11 transmissions. The process of calculating counting information ends at block 699.

Returning to process 600A, at decision block 620, the system determines if there are any other channels in the band of interest for which calculations of counting information is needed. If the system determines that there are other channels for which calculations of counting information is needed (block 620—Yes), the process returns to block 606 to set the counters to monitor another channel. If the system determines that there are no other channels for which calculations of counting information is needed (block 620—No), the process continues to block 625.

At block 625, the system accesses information about which channels in the band are permitted to be legally used in the region in which the wireless network diagnostics instrument is being operated. The information on permitted frequencies and/or the region of operation of the instrument can be stored in a memory unit within the wireless network diagnostics instrument and/or in a database that is external to the wireless network diagnostics instrument. At decision block 630, the system determines if any of the channels in the band of interest are not permitted to be used in the location that the instrument is operating. If the system determines that all of the channels are permitted to be used (block 630—No), the process displays the channel usage information without indicating that any channels are restricted. The process returns to block 605 for the next cycle for determining which wireless channels in the band of interest are being used.

If the system determines that one or more of the channels are not permitted to be used (block 630—Yes), at block 635 the process stores the information on which channels are illegal. Then the process continues to block 640 where the channel usage information is displayed, and the display also indicates which channels are being illegally used.

Figure 7:
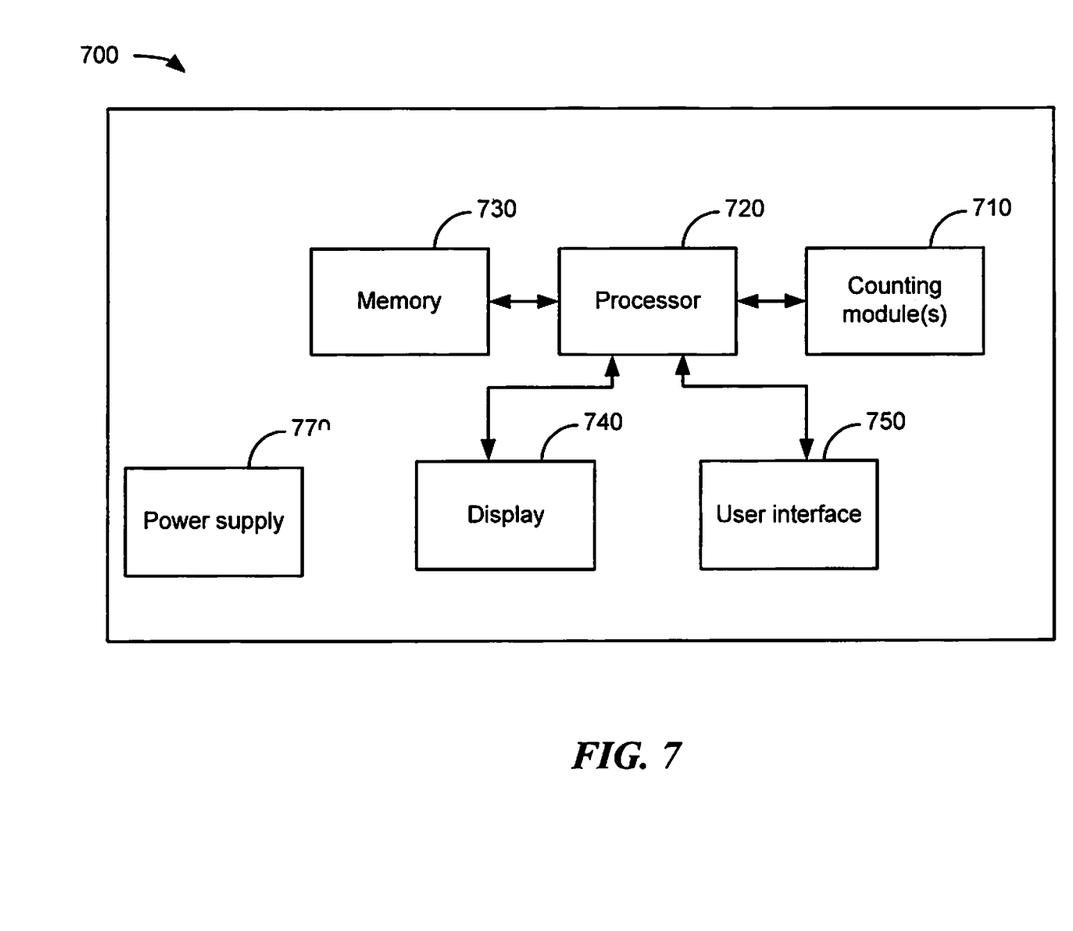
FIG. 7 is a block diagram illustrating an example of a system for determining channel usage, according to an embodiment of the disclosure.

FIG. 7 shows a block diagram illustrating an example of a system for displaying wireless channel usage, according to an embodiment of the disclosure. The wireless network diagnostics instrument can include one or more counting module or modules that perform counting functions 710, processors 720, memory units 730, displays 740, user interface 750, and power supply 770.

A chipset or other module(s) 710 can be used to receive transmissions over wireless channels in at least the 2.4 and 5 GHz bands. The module(s) 710 counts the number of clock cycles that have elapsed, the cumulative duration of detected IEEE frames, and the number of clock cycles over which a wireless channel is in use. The module(s) 710 performs these counts for each wireless channel to be monitored. In one embodiment, the module(s) 710 reside on an IEEE 802.11 or WiFi card.

A processor 720 can be used to run wireless network diagnostics instrument applications. In particular, the processor 720 can perform calculations on the counts received from the module(s) 710 and provide the calculations to the display 740 to show to the user in an intuitive manner. In one embodiment, the processor 720 is a field-programmable gate array (FPGA).

Memory 730 can include but is not limited to, RAM, ROM, and any combination of volatile and non-volatile memory. A power supply 770 can include, but is not limited to, a battery. A display 740 can include, but is not limited to, a visual display and a touch screen. The display 740 can show, for example, information about channel usage for each channel in a band, such as the percentage of time a channel is used for transmissions that follow IEEE 802.11 protocol, the percentage of time a channel is used for transmissions that do not follow IEEE 802.11 protocol, and the number of APs operating on the channel. A user interface 750 can include one or more buttons or switches for a user to specify data selections shown on the display 740 or to select commands for the wireless network diagnostics instrument.

In one embodiment, a user can select the "Channels" mode on the wireless network diagnostics instrument screen, as shown in FIG. 2B, by pressing the appropriate button or switch on the user interface 750. The processor or FPGA 720 detects the switch closure and sends read and write commands to the appropriate chipset registers (e.g. Atheros chipset) on an IEEE 802.11 card to initialize the card, clear the counters, scan the channels, and read the registers. The processor 720 then performs the calculations for converting the counter values to utilization percentages and formats the data for display. The data is then sent to the display 740 for displaying to the network technician user.

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above,"

"below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. Accordingly, the applicant reserves the right to add additional claims after filing the application to pursue such additional claim forms for other aspects of the invention.

What is claimed is:

1. An apparatus for displaying wireless communication channel usage, comprising:

a counter for counting in-use clock cycles, wherein a clock cycle is in-use when the wireless communication channel is being used;

a module for scanning wireless communication channels, wherein output of the module is sent to the counter;

a processor coupled to the counter, and the module, and the display, wherein the processor is configured to:

initialize the counter;

direct the module to scan specified wireless communication channels;

receive counter values from the counter for one or more wireless channels;

determine wireless communication channel usage following the IEEE 802.11 protocol and channel usage not following the IEEE 802.11 protocol based at least upon the counter values of the counter for the one or more wireless communication channels;

causing to be graphically displayed wireless communication channel usage following the IEEE 802.11 protocol and channel usage not following the IEEE 802.11 protocol for at least one of the one or more wireless channels.

2. The apparatus of claim 1 wherein the processor is further configured to:

direct the module to scan at least one of the one or more wireless communication channels for a first duration for access point beacons;

cause to be displayed a number of detected access points for the at least one of the one or more wireless channel.

3. The apparatus of claim 2 wherein the first duration at which the at least one of the one or more wireless communication channels is scanned is at least as long as a beacon interval.

4. The apparatus of claim 2 wherein the processor is further configured to:

interleave scans of wireless channels at the first duration with scans of other wireless channels at a second duration for each channel, wherein the second duration is shorter than the first duration.

5. The apparatus of claim 1 wherein the channel usage comprises a first percentage of time during which transmissions using the IEEE 802.11 protocol are made and a second percentage of time during which transmissions not using the IEEE 802.11 protocol are made.

6. The apparatus of claim 1 wherein the processor is further configured to: receive information about a region in which the apparatus is operated;

access a memory that identifies availability of operating wireless channels within the region;

provide operating availability information for at least one of the one or more wireless channels.

7. A computer-implemented method of displaying wireless communication channel usage, comprising:

receiving a counter value for in-use clock cycles for a wireless communication channel, wherein a clock cycle is in-use when the wireless communication channel is being used;

determining wireless communication channel usage based at least upon the counter value for the wireless communication channel;

causing to be graphically displayed the channel usage for the wireless communication channel.

8. The method of claim 7 wherein determining wireless communication channel usage includes determining a first percentage of time during which transmissions following IEEE the 802.11 protocol are made and a second percentage of time during which transmissions not following the IEEE 802.11 protocol are made using the wireless communication channel.

9. The method of claim 7 wherein causing to be graphically displayed the wireless communication channel usage comprises causing to be displayed the first percentage of time using a first color or shading and causing to be displayed the second percentage of time using a second color or shading.

10. The method of claim 7, further comprising:
receiving information about a region in which the computer-implemented method is performed;
accessing a database that identifies availability of operating channels within the region;
providing operating availability information for the wireless communication channel.

11. The method of claim 7, further comprising: scanning the wireless communication channel for access point beacons;
causing to be displayed a total number of detected access points for the wireless communication channel.

12. The method of claim 7, further comprising:
scanning a plurality of wireless communication channels for a first duration to detect access point beacons, wherein the first duration is at least as long as a beacon interval of an access point;
interleaving individual scans of wireless communication channels at the first duration with scans of other wireless communication channels at a second duration to detect access point beacons, wherein the second duration is shorter than the first duration;
determining a total number of access points operating on at least one of the plurality of wireless communication channels through the detected access point beacons.

13. The method of claim 12, further comprising causing to be displayed the total number of access points operating on at least one of the plurality of wireless communication channels.

14. The method of claim 12 wherein the first duration is between 100 ms and 110 ms, inclusive, and the second duration is between 10 ms and 20 ms, inclusive.

15. The method of claim 12 wherein each step is repeated until a command is received to stop scanning wireless communication channels.

16. The method of claim 12, further comprising storing the total number of access points operating on the at least one of the plurality of wireless communication channels.

* * * * *